United States Patent [19]
Enomoto

[11] Patent Number: 5,526,275
[45] Date of Patent: Jun. 11, 1996

[54] PROBE FOR IN-CIRCUIT EMULATOR WITH FLEXIBLE PRINTED CIRCUIT BOARD

[75] Inventor: Toshio Enomoto, Tokyo, Japan

[73] Assignee: NEC Corporation, Japan

[21] Appl. No.: 58,932

[22] Filed: May 7, 1993

[30] Foreign Application Priority Data

May 8, 1992 [JP] Japan ..................... 4-115595

[51] Int. Cl.⁶ ................................................... H01R 13/04
[52] U.S. Cl. ..................... 364/488; 361/760; 439/67
[58] Field of Search ............. 364/488; 395/500; 361/760, 749, 761; 439/492, 67

[56] References Cited

U.S. PATENT DOCUMENTS

| | | | |
|---|---|---|---|
| 4,661,921 | 4/1987 | Barnes | 361/683 |
| 4,749,356 | 6/1988 | Asai et al. | 439/67 |
| 4,832,621 | 5/1989 | Asai et al. | 439/492 |
| 4,964,074 | 10/1990 | Suzuki et al. | 395/500 |
| 5,367,436 | 11/1994 | Ikei | 361/766 |

*Primary Examiner*—Vincent N. Trans
*Attorney, Agent, or Firm*—Laff, Whitesel, Conte & Saret, Ltd.

[57] ABSTRACT

A probe for an in-circuit emulator for use in program verification and debugging during development of an equipment using a microcomputer is disclosed. The probe is formed by a flexible printed circuit board on which a plurality of conductive lines and a plurality of solder-connecting elements are provided. The conductive lines and the solder-connecting elements are electrically connected through a plurality of through-holes provided in the flexible printed circuit board. The solder-connecting elements of the probe are solder-connected to conductive lines of a target board to be emulated. The in-circuit emulator does not require a dummy chip, which makes the probe simple in its structure and economical in the fabrication thereof.

3 Claims, 8 Drawing Sheets

PROBE FOR IN-CIRCUIT EMULATOR WITH FLEXIBLE PRINTED CIRCUIT BOARD

BACKGROUND OF THE INVENTION

1. Field of the Invention

The present invention relates to an in-circuit emulator, and more particularly to a probe using a flexible printed circuit board.

2. Description of the Related Art

For the purpose of assisting in the understanding of the present invention, a conventional probe for the in-circuit emulator of the type relevant to the present invention is first explained with reference to the related drawings.

FIG. 1 shows in sectional view a conventional probe of the kind to which the present invention relates. As shown in FIG. 1, a target board conductor line 12 is provided on a target board 10 and a dummy chip 18 to which a dummy chip lead 14 is fixed is provided on this target board conductor line 12. The dummy chip 16 detachably receives a probe head 18 from which a flat cable 19 is drawn out.

FIG. 2 shows in perspective view a microcomputer program development system to which the probe shown in FIG. 1 is connected. As seen in FIG. 2, the target board 10 carrying thereon the dummy chip 16 is prearranged, and the flat cable 19 having the probe head 18 at the foremost end is connected to an in-circuit emulator 20 which in turn is connected to a personal computer 22.

First, an object of using an in-circuit emulator (hereinafter referred to as an "ICE") is briefly explained. For producing an equipment using a microcomputer, it is required to prepare a hardware of the equipment and a software for the microcomputer for controlling the hardware. In order to realize the functions brought out by specifications of the equipment, the functions to be assigned to the hardware and those to the software are sorted out and the former and the latter are separately designed and organized. The hardware and the software thus organized separately from each other are put together and are caused to operate together, whereby whether the equipment operates in a way to satisfy the specifications is verified.

The ICE 20 is an equipment used for making the above verification, which provides operational environments for the software to be executed and verification supporting functions such as a function to execute sequential instructions step by step and a function to interrupt execution of instructions when certain conditions are met. The ICE 20 also provides, as a hardware function, a function to input to and output from the probe head 18 a signal which is the same as the signal inputted to and outputted from an external terminal of the microcomputer in the equipment under development. Thus, when the probe is connected to the hardware of the equipment under development and the software is executed on the ICE 20, the various operations expected from the microcomputer on the basis of the software are emulated by the ICE 20, so that the same signal as outputted by the terminal of the microcomputer is outputted from the terminal of the probe and the same control as effected by the microcomputer is realized.

In the ICE 20 as described above, the conventional probe of the ICE 20 employs an arrangement wherein its tip portion has a dummy chip 18 (shown in FIG. 4) the shape of which is the same as the shape of the terminal of the microcomputer to be emulated. Where the shapes are the same in this way, the circuit patterns of the target board conductor 12 of the printed circuit board (as shown in FIG. 3) which is a part of the hardware of the equipment under development remain fixed or unchanged. Thus, the purpose of such arrangement is to complete the development of the equipment as a finished equipment by removing the probe of the ICE and then mounting the microcomputer in its place. That is to say, in this arrangement, the operational reliability of the equipment can be ensured because the pattern of the printed circuit after the completion of the verification of the functions of the equipment is in its finished state and undergoes no further changes.

FIG. 3 shows in plan view a plurality of circuit patterns provided on a conventional target board and FIG. 4 shows also in plan view a state in which a dummy chip 16 is soldered on the target board 10 shown in FIG. 1.

As seen in FIG. 3, the leads 14 of the dummy chip 16 are arranged in all four directions and the conductive lines 12 on the target board 10 are electrically connected to the leads 14, respectively.

In the conventional probe of the ICE explained above, it is required that the dummy chip 16 at the foremost end portion of the probe be made in conformity with the shape of the terminal of the microcomputer to be subjected to emulation.

In recent years, kinds of microcomputers have become diversified and, particularly in microcomputers used for control purposes, there is an increasing trend wherein the same function is applied to a plurality of terminal shapes or a given function is added or eliminated depending on needs in the development of equipment.

In order to meet the changing needs in the development of equipment using microcomputers, it is desired that, in the ICE, too, the dummy chip 16 at the foremost end of the probe be improved.

However, since the dummy chip 16 normally employs at its body an engineering plastic and has a terminal portion made of metal foils, it is necessary to make a metal mold specific to the body and make the terminal portion mostly by hand. This is a disadvantage in that the fabrication thereof is not efficient, is costly and involves a long time.

Also, it must be noted that in recent years there is an increasing trend for spaces between terminals of a microcomputer to be reduced, and this makes it impossible to have the dummy chip 16 formed by the conventional method, or if formed, the chip thus formed frequently does not have sufficient strength for practical use.

SUMMARY OF THE INVENTION

It is, therefore, an object of the present invention to overcome the problems existing in the conventional arrangements as described above and to provide an improved probe for an in-circuit emulator which requires no dummy chip and which is simple in its structure and is not costly in the fabrication thereof.

According to one aspect of the invention, there is provided a probe formed by a flexible printed circuit board and connected to an in-circuit emulator for use in program verification and debugging during development of an equipment using a microcomputer, the probe comprising:

a plurality of conductive lines which are provided on the flexible printed circuit board and coupled to the in-circuit emulator; and a plurality of solder-connecting elements which are solder-connected to conductive lines provided on a target board that is subjected to emulation.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF THE PREFERRED EMBODIMENTS

Figure 1:
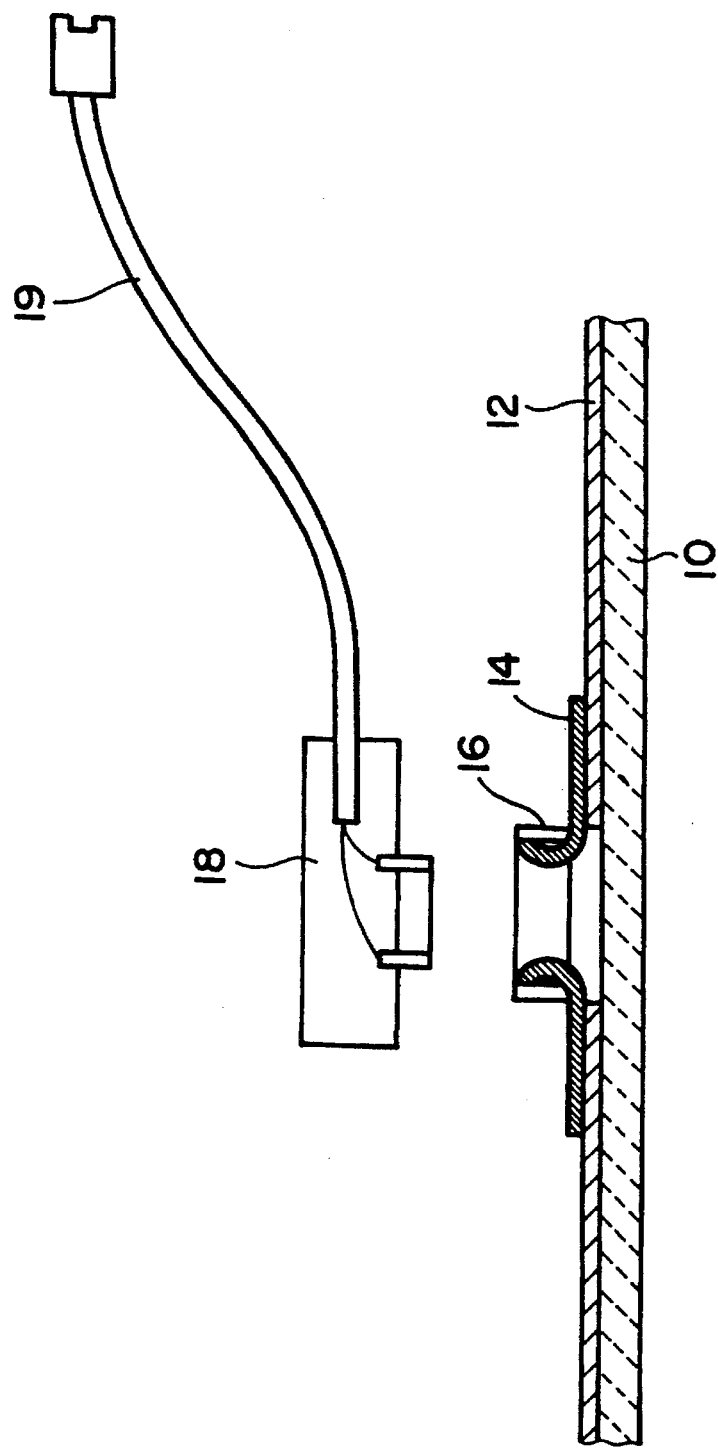
FIG. 1 is a sectional view showing a conventional probe of the kind to which the present invention relates.
Figure 2:
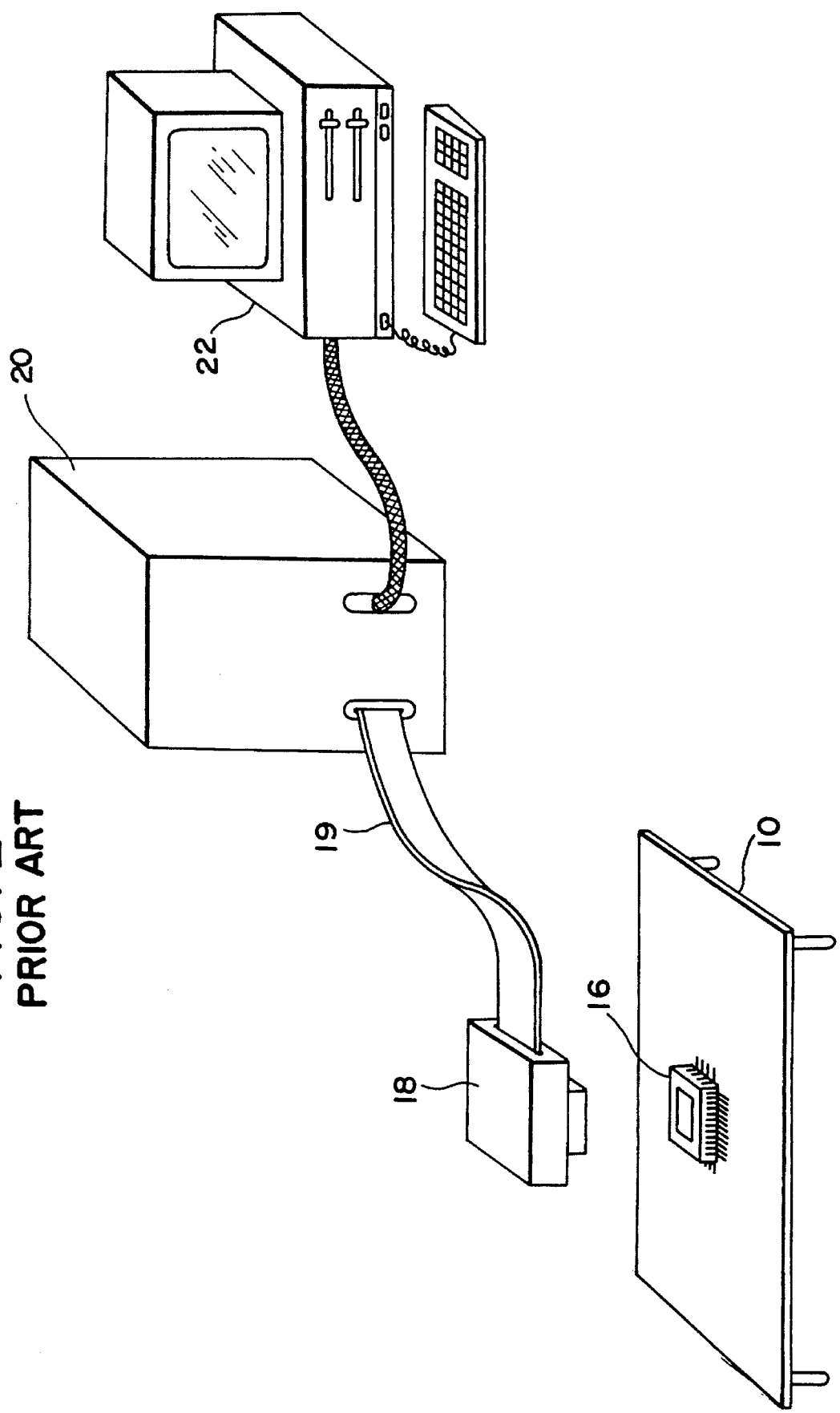
FIG. 2 is a perspective view showing a conventional microcomputer program development system.
Figure 3:
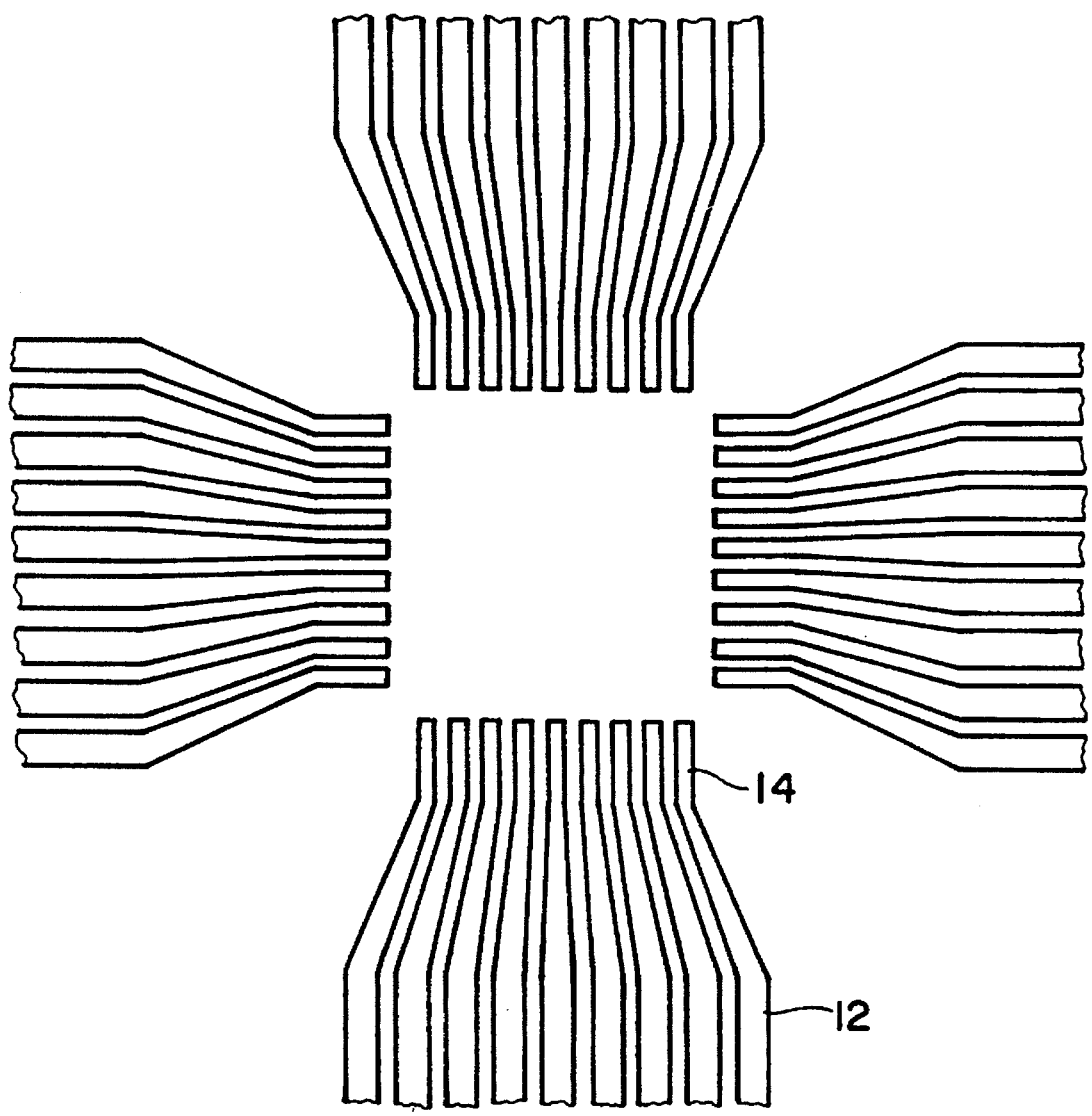
FIG. 3 is a plan view showing a plurality of circuit patterns provided on a conventional target board.
Figure 4:
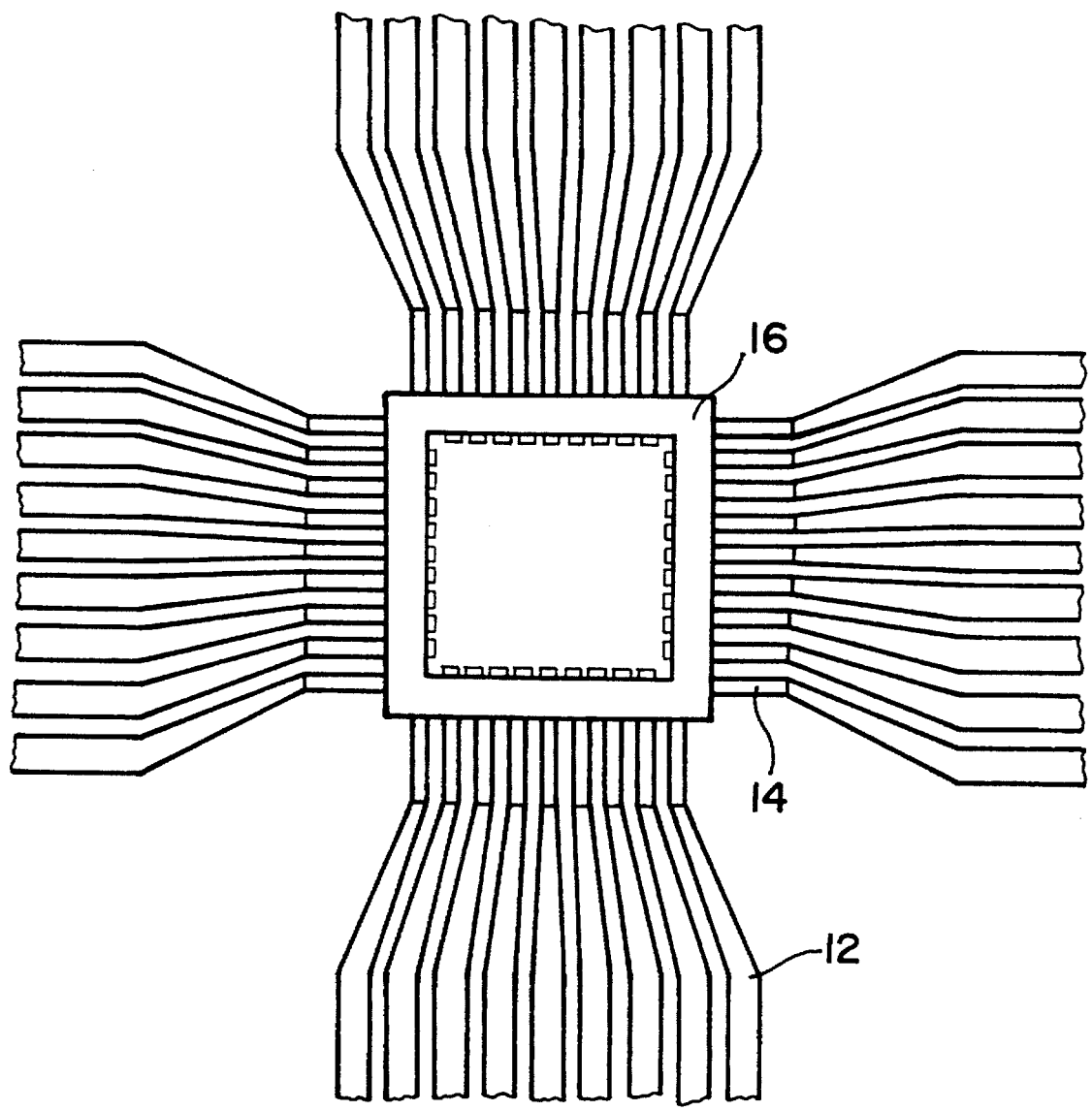
FIG. 4 is a plan view showing a state in which a dummy chip is soldered on the target board shown in FIG. 1.

Now, preferred embodiments of the invention will be explained with reference to the accompanying drawings. It is to be noted that, throughout the following explanation, similar reference numerals or symbols refer to the same or similar elements in all the figures of the drawings.

Figure 5:
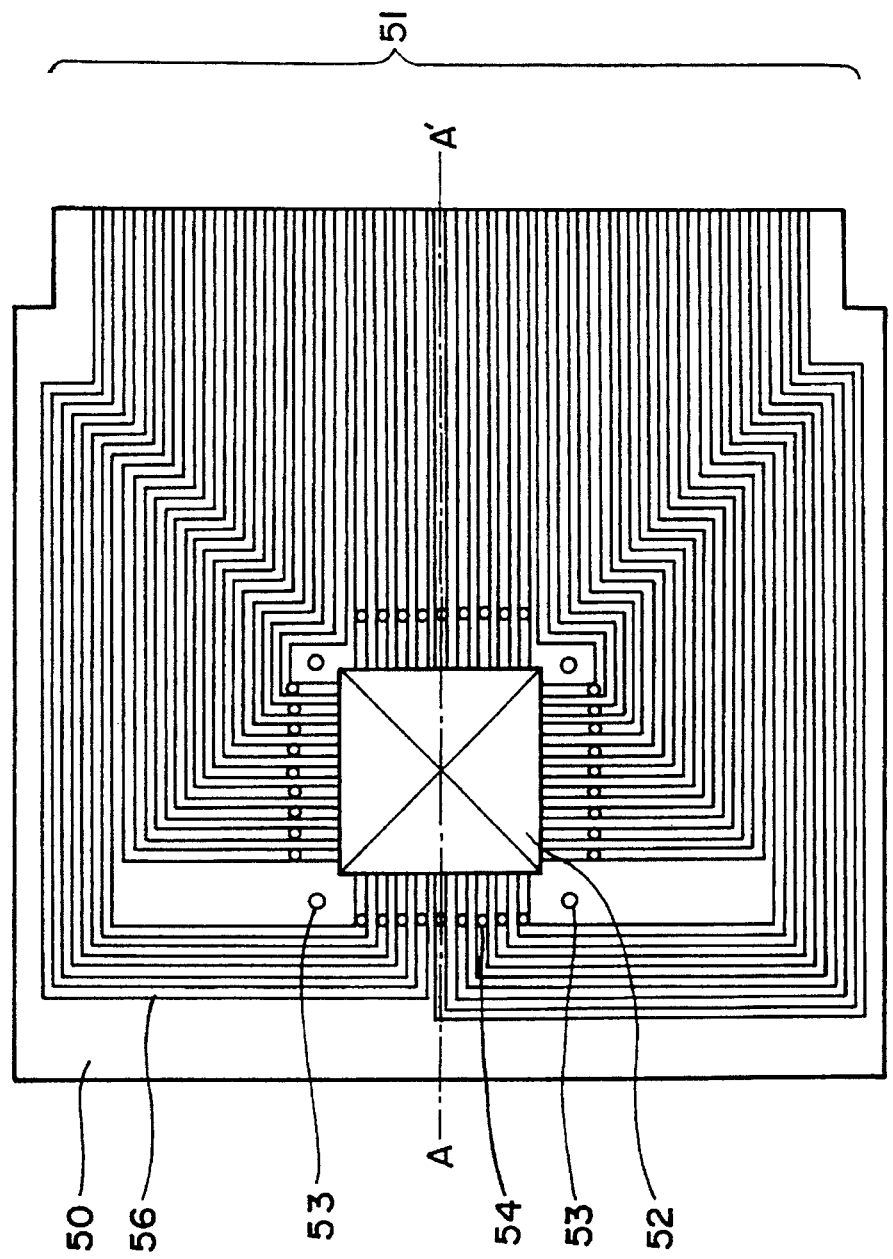
FIG. 5 is a plan view showing a probe for an in-circuit emulator of a first embodiment according to the present invention.

FIG. 5 shows in plan view a flexible printed circuit board 50 according to a first embodiment of the invention. As seen in FIG. 5, the printed circuit board 50 constitutes electric circuitry with the upper and back surfaces of a flexible board being etched and provided with a number of conductive lines 56.

In the specific example shown in FIG. 5, the printed circuit board 50 has a card edge portion 51 at one edge, a square window 52, four screw holes 53, and nine through-holes 54 at each side around the square window 52. Thus, there exist thirty six through-holes 54 around the square window 52. The conductive lines 56 on the upper surface and those on the back surface are interconnected through these through-holes 54.

More specifically, the probe for the ICE 20 in this embodiment of the invention utilizes the flexible printed circuit board 50 with a solder-connecting portion 58 (seen in FIG. 6) which corresponds to an under surface of a target IC terminal, being provided on the back surface of the flexible printed circuit board 50. The probe includes the through-hole 54 through which the conductors 56 at the upper surface and at the back surface of the flexible printed circuit board 50 are electrically connected together, the screw holes 53 for positioning and keeping the probe in place, and the window 52 for facilitating soldering the flexible printed board 50 and the target board 60 together.

The conductive lines 56 are led around edge portions of the flexible printed circuit board 50 for having the in-circuit emulator to be connected thereto, with the card edge portion 51 being formed at one edge portion. The conductive lines 56 are connected to the ICE 20 through the connector 57 and the flat cable 59 as seen in FIG. 7.

Figure 6:
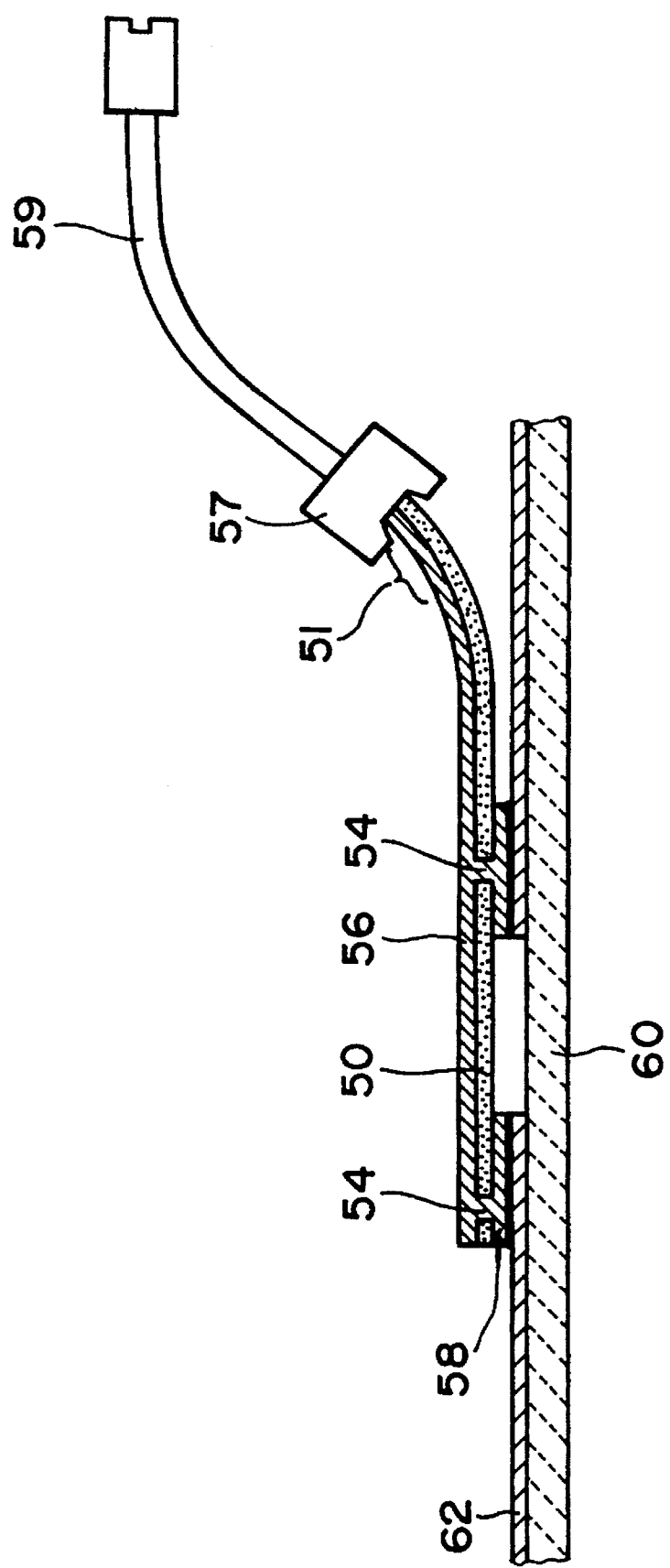
FIG. 6 is a sectional view showing a state in which the probe shown in FIG. 5 is soldered on a target board.

FIG. 6 shows in sectional view a state in which the printed circuit board 50 is mounted on the target board 60, the sectional view taken along A—A' line in FIG. 5. As seen in FIG. 6, the flexible printed circuit board 50 shown in FIG. 5 is soldered by the solder-connecting portion 58 to the target board conductive lines 62 on the target board 60, thereby establishing electric conduction therethrough. Thus, a signal from the conductor 62 on the target board 60 is allowed to pass through the solder-connecting element 58, the through-hole 54 and the conductors 58 and transmitted from the card edge portion 51 to the ICE 20 through a connector 57 and the flat cable 59. A signal from the ICE 20 to the target board 60 follows a path in reverse to the above.

Figure 7:
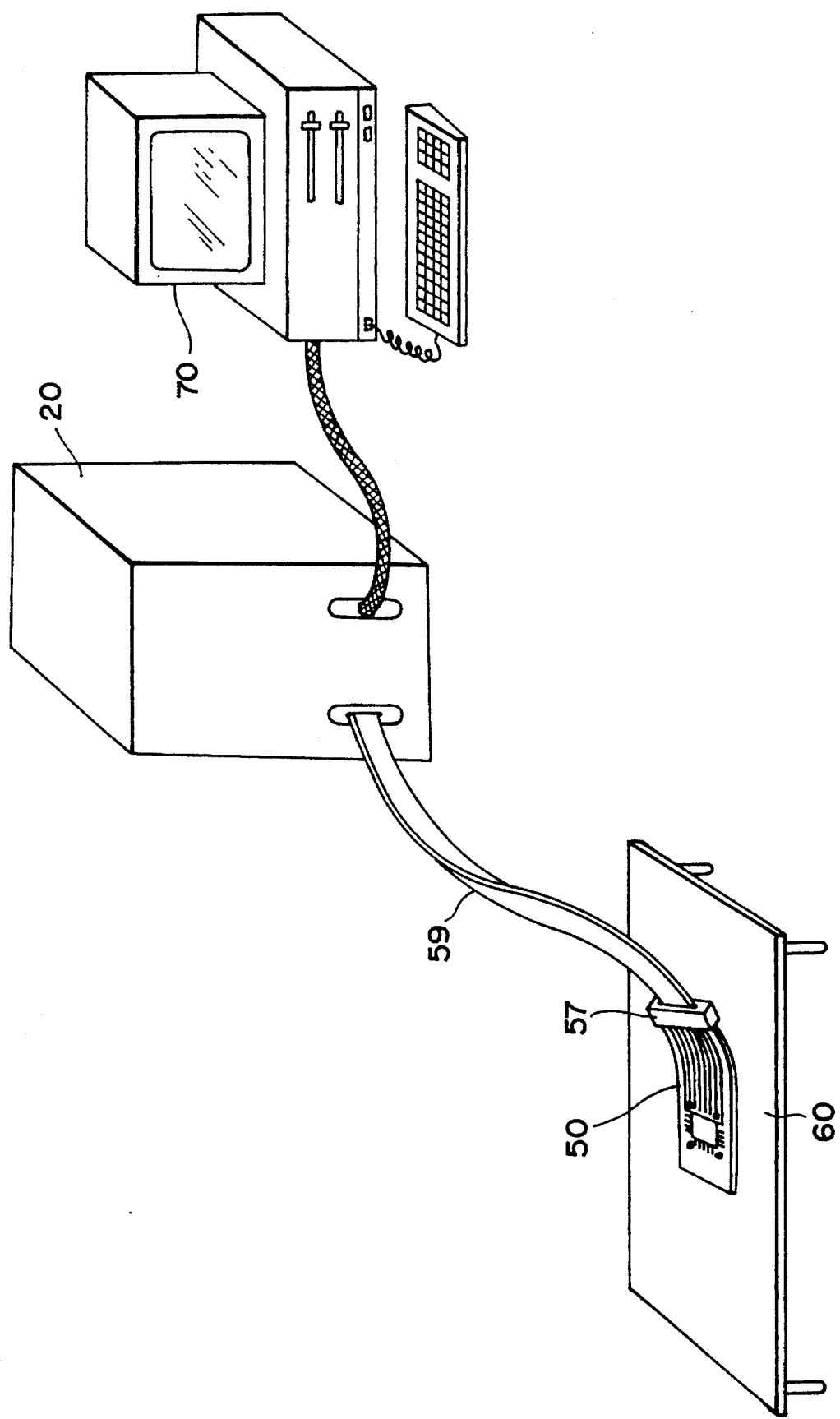
FIG. 7 is a perspective view showing a microcomputer program development system utilizing the probe of the first embodiment according to the present invention.

FIG. 7 shows in perspective view a program development system utilizing the target board and the printed circuit board shown in FIG. 6. The personal computer 70 controls the ICE 20. The emulator signal passes through the flat cable 59 and, via the connector 57, passes through the conductive lines 62 (seen in FIG. 5) of the flexible printed circuit board 50 for controlling the circuitry on the target board 60.

In the embodiment shown in FIG. 5, the screw holes 53 serve to positioning and securing the flexible printed circuit board 50 on the target board 60 and the window 52 facilitates soldering of the flexible printed circuit board 50 onto the target board 60.

As explained above, since the probe is in the form a flexible printed circuit board 50, the probe does not require the dummy chip 16 unlike in the conventional arrangement and the probe itself is structurally simple and is markedly cost saving as shown in the following table.

TABLE

|  | CONVENTIONAL | INVENTION |
| --- | --- | --- |
| Cost of dummy-chip mold | ¥800,000 | ¥0 |
| Cost for making dummy-chip | ¥20,000 | ¥0 |
| Cost for making probe | ¥45,000 | ¥10,000 |
| TOTAL | ¥865,000 | ¥10,000 |

Further, the fact that the probe is structurally simple also means that it provides sufficient strength in the actual structure obtained.

Also, since the forming of conductive lines 56 on the flexible printed circuit board 50 by means of etching is comparatively simple and can be done in a short period of time, the invention is fitted to a wide variety of applications, a small quantity fabrication, and a short term fabrication.

Figure 8:
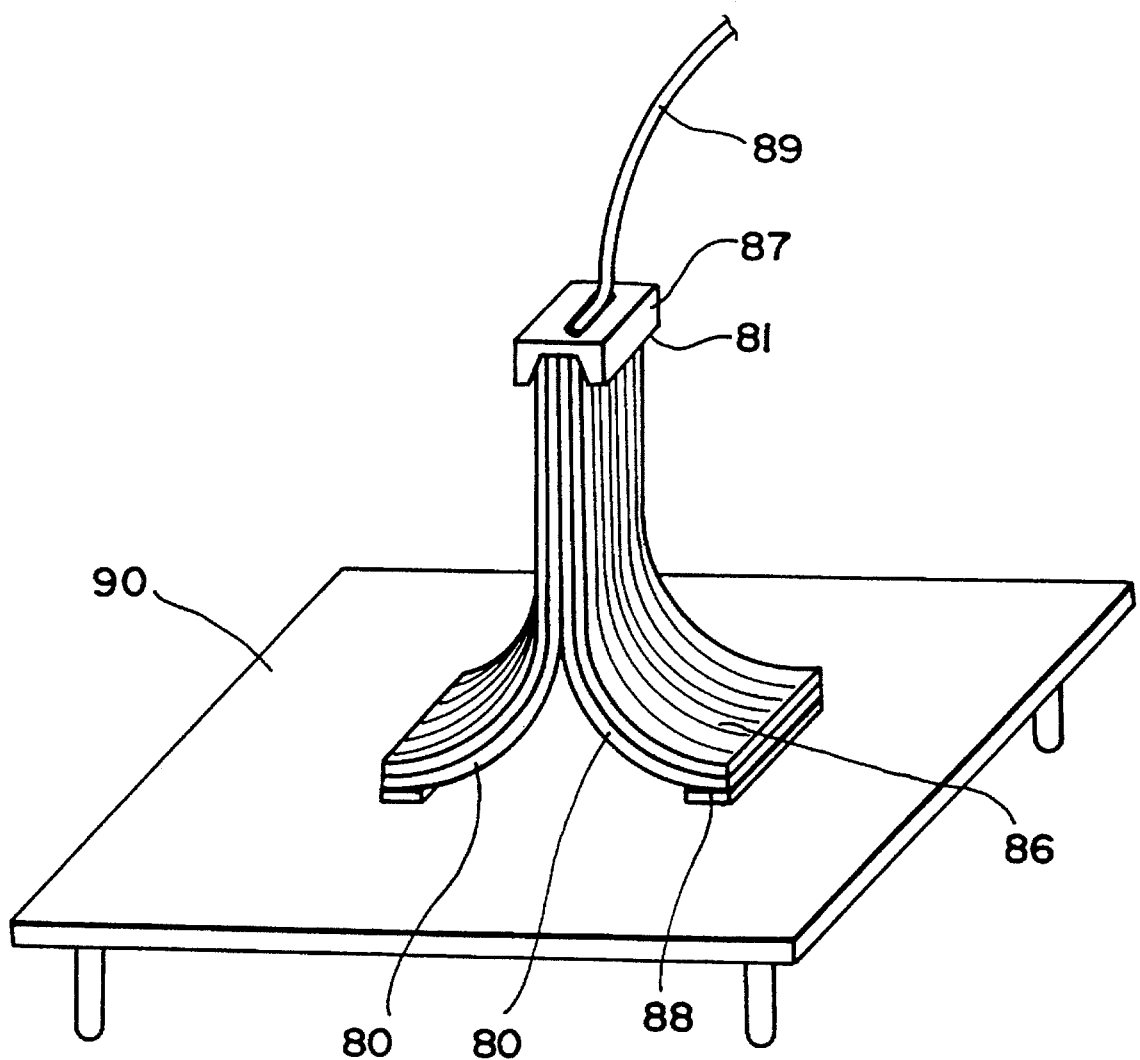
FIG. 8 is a perspective view showing a probe for an in-circuit emulator of a second embodiment according to the present invention.

FIG. 8 shows in perspective view a probe for an in-circuit emulator according to a second embodiment of the invention. As seen in FIG. 8, the flexible printed circuit board 80 is connected to the target board 90 through the solder-connecting element 88, the conductive lines 86 are connected at the card edge portion 81 to the connector 87 from which the flat cable 89 is drawn out.

The probe according to this second embodiment is adapted to be used for microcomputers having leads of dual in-line package type (DIP) semiconductor devices. For the DIP type, the probe according to this second embodiment, which is more compact and easier in use, is better suited than the probe according to the first embodiment.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A probe formed by a flexible printed circuit board and connected to an in-circuit emulator for use in program verification and debugging during a development of an equipment using a microcomputer, said probe comprising:

a plurality of conductive probe lines which are provided on an upper surface of said flexible printed circuit board and coupled to said in-circuit emulator;

a plurality of solder-connecting elements which are provided on a back surface of said flexible printed circuit board and are solder-connected directly to target board conductive lines provided on a target board that is subjected to emulation, a square window which is opened in said flexible printed circuit board; and a plurality of through-holes which are provided around said square window and through which said conductive probe lines and said solder-connecting elements are electrically connected.

2. A probe formed by a flexible printed circuit board according to claim 1, in which said probe is so shaped as to be adapted to an equipment using a microcomputer in a dual in-line package type.

3. A probe formed by a flexible printed circuit board according to claim 1, in which said probe has a card edge portion to be received by a connector that is provided at the foremost end of a flat cable connected to said in-circuit emulator.

* * * * *